METHOD OF PRODUCING SEMI-CONDUCTIVE DEVICES, MORE PARTICULARLY TRANSISTORS

Filed July 3, 1959

INVENTOR
LEONARD JOHAN TUMMERS
BY
Frank R. Jrifari
AGENT

United States Patent Office 3,074,826
Patented Jan. 22, 1963

3,074,826

METHOD OF PRODUCING SEMI-CONDUCTIVE DEVICES, MORE PARTICULARLY TRANSISTORS

Leonard Johan Tummers, Eindhoven, Netherlands, assignor to North American Philips Company Inc., New York, N.Y., a corporation of Delaware
Filed July 3, 1959, Ser. No. 824,868
Claims priority, application Netherlands Aug. 7, 1958
5 Claims. (Cl. 148—1.5)

Figure 1:
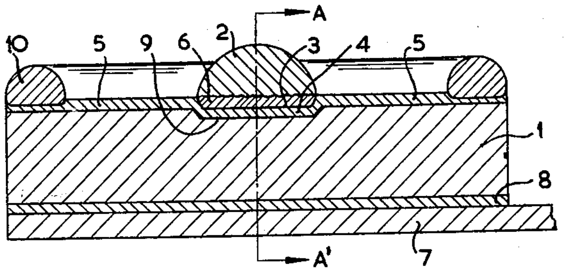

The inention relates to a method of manufacturing a semi-conductive device, more particularly, a transistor, in which a quantity of electrode material containing an active impurity of one type is alloyed to a semi-conductive body and in which, during the alloying process, an active impurity of the other type is diffused via the liquid-solid interface between melt and body, into the body, so that, subsequent to cooling, an alloy electrode of one conductivity type is obtained on a diffused zone or region of the other conductivity type.

With this known method, which is also known as the alloy-diffusion technique, the two active impurities of opposite type and the composition of the electrode material are chosen so that the said active impurity of one type, hereinafter also referred to as the segregating impurity, is left, during the cooling process, in the recrystallizing semi-conductive layer of the alloy electrode in an excess quantity as compared with the diffusing impurity of the other type, whereas the impurity to be diffused must have a materially higher diffusion velocity than the segregating impurity. The temperature of the alloying process is chosen to be high, so that the diffusion takes place within a reasonable time during the melting process. In order to avoid an excessive penetration depth of the melt in the body at this high temperature, use is frequently made of an electrode material which consists for the major part of practically neutral material, which dissolves only a small quantity of the body, for example in the case of germanium, lead or bismuth, to which the two impurities of opposite type, i.e. one or more donors and one or more acceptors, are added in a suitable, adequate concentration.

The transistor issue of the "Proceedings of the I.R.E.," June 1958, page 1161 describes, in particular, the use of this combined alloy-diffusion technique for the manufacture of transistors. Therein, a semi-conductive body of a given conductivity type has alloyed to it, at high temperature, an emitter electrode of the same conductivity type, whilst during the alloying process the base zone is diffused from the emitter-electrode melt into the body. Thus, in a simple manner, in one process, a pnp- or npn-structure is provided on a semi-conductive body, the intermediate n- or p-zone being provided with extreme thinness in a reproduceable manner. See also the description in a copending application Serial 676,563, filed August 6, 1957, for further details of this technique.

It has been found, however, that with semiconductive devices, for the manufacture of which this alloy-diffusion technique is employed, the current passing between the alloy electrode and the diffused zone is less favourable with low currents than with higher currents. Thus, for example, with transistors, in which the alloy electrode is used as the emitter electrode, the variation of the current amplification factor with low emitter injection is materially more unfavourable than with high emitter injection.

The invention has for its object, inter alia, to provide a measure to improve these conditions.

It is based inter alia on the recognition of the fact that this unfavourable effect is due to inherent diffusion of the segregating impurity, which although its diffusion velocity is materially lower than that of the diffusing impurity, yet diffuses during the alloying process into the diffused zone portion adjacent the alloy electrode and which thus compensates the action of the diffusing impurity in the immediate proximity of the alloy electrode to an extent depending upon its diffusion velocity, thus producing a drift field in an unfavourable sense in the said compensated region.

In accordance with the invention, when use is made of the alloy-diffusion technique, the region of the diffused zone partly compensated by inherent diffusion of the impurity of one type, hereinbefore also termed the segregating impurity, is dissolved to at least half of its penetration depth, subsequent to the diffusion process, by an only short thermal after-treatment at an effective temperature exceeding the temperature of the diffusion process. Owing to the short thermal after-treatment at a higher effective temperature, the partly compensated region is preferably dissolved to its full penetration depth. As an alternative, not only the compensated region but also a further remote part of the diffused zone may be dissolved by the short thermal after-treatment, although, as a matter of fact, the post heating is carried out so that the complete diffused zone is not dissolved.

The method according to the invention utilizes therefore the known fact that in the state of equilibrium the penetration depth of an electrode material in a semiconductor, with a given dimension of the electrode surface, is determined by the nature and the quantity of the electrode material, the nature of the semi-conductor and the temperature of the melt and that, as a rule, this penetration depth can be increased by increasing the quantity of electrode material and by increasing the temperature of the melt. In certain cases the solution of the compensated region can therefore be restricted by an increase in temperature or in the quantity of electrode material, or by a combination of these two factors. The expression "thermal after-treatment at an effective temperature exceeding . . ." should therefore be conceived in such a wide sense that it includes the said three possibilities. An increase in the quantity of electrode material may be obtained by adding, subsequent to the diffusion process, a suitable quantity of additional electrode material in a molten or solid state to the electrode material or the melt in the jig, after which the after-treatment may take place even at a lower temperature, preferably at the same temperature. It is to be preferred, however, to use that method according to the invention, in which the short thermal after-treatment is formed by a real increase in temperature without an increase in electrode material, since this method is very simple and reproduceable. Since the compensated region is usually very thin, for example a few tenths of microns, the temperature increase is, as a rule, low, for example a few degrees centigrade. In accordance with a method according to the invention which has proved to be very efficient, the short thermal after-treatment takes place immediately after the diffusion treatment, since a relative change in temperature can be very accurately controlled, even if the temperature of the diffusion process is 600 to 800° C.

It is essential that the thermal after-treatment should last only for a short time, which is to be understood to mean that the duration should be so short that substantially no further diffusion takes place during that period. At any rate the time of thermal after-treatment should be short as compared with the diffusion time, in order to achieve the improvement aimed at; it should, for example, be less than 1/10 of the diffusion time, or preferably even shorter.

The method according to the invention is particularly suitable for use in the manufacture of transistors, in which an emitter electrode is alloyed onto a semi-conductive body of a given conductivity type, the electrode being of the same conductivity type, while during the alloying process, owing to diffusion of an active impurity of opposite conductivity type via the transition between melt and body, the base zone is provided underneath the emitter electrode. The short thermal treatment according to the invention is capable of providing a material improvement in the current conveyance and hence in the current amplification factor of the transistor at a low current intensity without affecting the behaviour at a higher current intensity.

The invention also relates, as a matter of fact, to the semi-conductive device and particularly to the transistor manufactured by carrying out the method according to the invention.

Figures 2A, 2B, 2C:
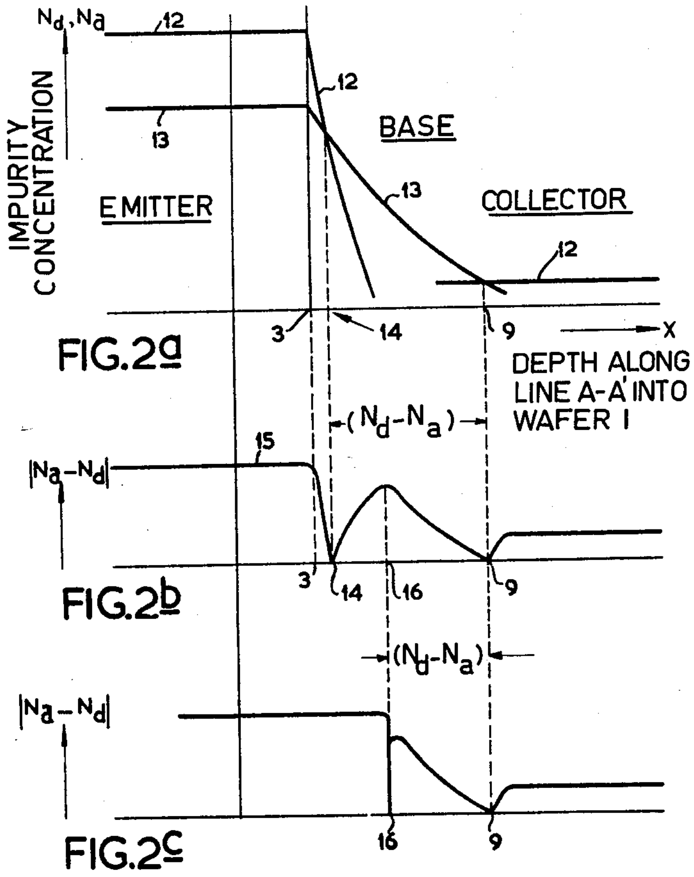

The invention will now be described more fully with reference to the accompanying drawing, in which:

FIG. 1 is a diagrammatical longitudinal section of a transistor manufactured by the known "alloy-diffusion" process, whereas FIG. 2*a* shows diagrammatically the variation of the donor- and acceptor-concentrations on the line AA' of FIG. 1 on an enlarged scale, for the sake of clarity, and FIG. 2*b* shows, plotted on the same axis, the associated variation of the uncompensated impurity concentration $N_a$-$N_d$.

FIG. 2*c* shows the variation of the uncompensated impurity concentration after the use of the method according to the invention.

FIG. 1 shows diagrammatically, in a longitudinal sectional view, an embodiment of a semi-conductive device, i.e. a transistor, which is manufactured by the known alloy-diffusion process. With reference to this embodiment the idea of the invention and the improvement proposed in accordance with the invention will be explained.

Onto a semi-conductive body 1 of p-type germanium is alloyed a quantity of electrode material 2, which may consist, for example, of 94% by weight of bismuth, 5% by weight of segregating aluminum impurity and 1% by weight of diffusion arsenic impurity. The assembly is heated at a fairly high temperature, for example, 760° C., in a neutral gas atmosphere for 15 minutes. Thus the electrode material 2, in the molten state, penetrates up to the boundary surface 3 into the body. Via this transition between melt and body, owing to the diffusion of the arsenic, a thin layer 4 underneath the electrode material is converted into n-type germanium. The diffused zone 4 has, subsequent to the diffusion, penetrated to a depth of, for example, $3/\mu$ underneath the melt into the body. In order to be able to provide in a simple manner a base contact on the said thin zone, a surface zone 5 associated with the zone 4 is provided simultaneously from the ambient atmosphere also in the adjacent surface at the side of the electrode by diffusion of a donor. To this end use may be made of the same arsenic which evaporates during the heating process from the electrode material 2, or else the arsenic may be supplied from a different source from the surroundings. As a further alternative, however, the arsenic may be supplied, not in advance, but afterwards to the electrode-material melt to diffuse the zone 4 and the zone 5 associated therewith. During the diffusion of the arsenic, however, also the aluminum, though with a materially lower diffusion velocity, will penetrate into the body from the melt, where, in accordance with its lower diffusion velocity, it will compensate the effect of the arsenic down to a small penetration depth in the diffused zone 4. Before dealing more extensively with this matter, first the further course of the manufacture of these transistors will be explained. During cooling, first a recrystallized, semi-conductive layer 6 settles on the diffused zone 4, the said layer being of strong p-type conductivity owing to the excess quantity of aluminum in the melt and the high segregation constant of aluminum; on the said recrystallized layer 6 the contact 2 will then solidify. The electrode (2, 6) is then used as an emitter electrode and the n-type zone 4 as a base zone. With the base zone 4 is established an ohmic connection by alloying an annular lead-arsenic part 10 (Pb. 99% by weight; As 1% by weight), at a lower temperature, onto the surface layer 5 associated with the base zone. The remaining p-type portion of the body is soldered to a nickel base 7, for example, with the aid of an indium-gallium alloy 8 (In 99.5% by weight; Ga. 0.5% by weight), which portion, together with the nickel base 7, constitutes the collector electrode of the system. The assembly is etched in a conventional manner to remove an n-type layer, if any, on the side edges of the disc and then finished in a conventional manner in an envelope.

The idea of the invention and the measure according to the invention will now be explained more fully with reference to FIGS. 2*a*, 2*b* and 2*c*.

FIG. 2*a* shows diagrammatically the variation of the donor concentration $N_d$ and of the acceptor concentration $N_a$; they are plotted in arbitrary units on the ordinate, their position in the semi-conductive body along the line AA' of FIG. 1 being plotted on the abscissa. For the sake of clarity, the region in the neighborhood of the emitter electrode, where the troublesome diffusion takes place, is shown on an enlarged scale with respect to the remainder of the diffused zone. The lines 12 and 13 of these figures relate to the acceptor concentration and to the donor concentration respectively. On the right-hand side of point 9 is located the p-type layer of the collector, where the initial, prepondering acceptor concentration 12 in the body is maintained. Point 9 itself indicates the transition between the arsenic-diffused n-type layer 4 and the initial p-type body. On the left-hand side of point 3 is located the p-type recrystallized layer 6 of the emitter electrode. Point 3 itself is the transition between the melt and the body. Between 3 and 9 is located the diffused arsenic-containing zone 4 of FIG. 1. The arsenic concentration in this region exhibits the variation 13 characteristic of diffusion. Although to a much smaller extent, also the aluminum has diffused from 3 into this zone in accordance with the course of the curve 12. Between 3 and 14 the conditions are even such that, owing to a higher surface concentration, the aluminum has overcompensated the arsenic, the semi-conductor there being of the p-type. Between 14 and 9 is hence located the n-type base zone proper of the transistor, of which the portion adjacent the emitter is partly compensated by the diffused aluminum acceptors. This partial compensation is clearly evident from the graph of FIG. 2*b* of the uncompensated number in the various regions of impurities $N_d$-$N_a$ in dominating conditions, this graph being obtained simply by subtracting the lines 12 and 13 shown in FIG. 2*a*. In the collector zone on the righthand side of point 9 and in the emitter zone on the left-hand side of point 14 $N_a$-$N_d$ is plotted, the acceptors prevailing in majority and determining the p-type conductivity. In the base zone between 14 and 9, however, the donors dominate and in this region is plotted ($N_d$-$N_a$). From the course of the curve 15 in the base region it is evident that the holes injected from the emitter side into the base between 14 and 16 are first exposed to a drift field orientated towards the emitter and then, between 16 and 9, to an accelerating field. This counterfield, occurring between 14 and 16, is due to the diffusion of the segregating aluminum impurity and the consequent partial compensation of the diffused arsenic. Owing to this counterfield the current conduction through the p-n transistion is more difficult at lower current intensity than with high current intensity, in which latter case this unfavourable part of the base is flooded by charge carriers to an extent such that the influence of the counteracting drift field is neutralized there. The idea of the invention involves a method in which the region between 14 and 16 of the diffused zone (14, 9) partly compensated by diffusion of the segregating impurity is dissolved to at least half its penetration depth, preferably completely or even to a further extent by an only short thermal after-treatment at an effective temperature which is higher than the temperature of the diffusion process. The influence of this treatment is evident from FIG. 2C, in which the same magnitudes are plotted in the same manner as in FIG. 2B, but after the measure according to the invention has been carried out. The partly compensated region located in the base zone between 14 and 16 is thus completely dissolved and the emitter is then located at point 16. Apart from an improvement in current conduction, an improvement in the frequency behaviour is obtainable, since the counterfield in the base is eliminated. With respect to the increase in temperature it should be noted that it varies with the thickness of the compensated region to be eliminated between 14 and 16, which thickness is, in itself, determined by the diffusion velocities of the segregating and the diffusing impurities and the diffusion time, while, moreover, the value of the required temperature increase varies with the phase diagram of the electrode material and the semi-conductor. Taking these factors into consideration, which vary with circumstances, this magnitude can, at any rate, be determined in a simple manner. For example, the ratio between the penetration depth of the region partly compensated by diffusion and the penetration depth of the diffusing impurity may be substantially equal to the square of the ratio of the diffusion velocities of the segregating impurity and the diffusing impurity. In the case described above for the bismuth-aluminum-arsenic alloy the troublesome diffused penetration depth was about $0.2/\mu$ and the partly compensated region could be eliminated by an increase in temperature of 2° C. over the diffusion temperature of 760° C. for 30 seconds, which involved an improvement in the current amplification factor at low current intensity and also at high frequencies.

It should be noted that the use of the measure according to the invention is, of course, not restricted to the manufacture of transistors and that it may be utilized, in general, with the manufacture of a semi-conductive device in which the combined alloy-diffusion process is employed in any form. For example, the invention may also be carried out with the manufacture of the known "Hook" transistors, in which a region associated with the diffused zone for the application of a contact is not required. The invention is neither confined to the use of germanium. It may be carried out with the same, advantageous result also with silicon or other semi-conductors, for example $A_{III}B_V$-compounds. Whereas the combined alloy-diffusion process is particularly suitable for the manufacture of pnp-transistors on germanium, since many donor impurities diffuse into the germanium with higher speed than the acceptor impurities, the combined alloy-diffusion process with silicon is extremely suitable for the manufacture of npn-transistors, since frequently the acceptors diffuse into silicon more rapidly than the donors. The invention may therefore also be carried out in those cases in which the diffusing impurity is of the same type as the semi-conductive body and the diffusion of this impurity from a melt containing a segregating impurity of opposite type is used only to obtain a drift field underneath the electrode.

What is claimed is:

1. In the method of manufacturing a semiconductor device in which a mass of electrode-forming material containing a first active impurity of one conductivity-type having a relatively high segregation constant and a relatively low diffusion velocity is fused and melted to a semiconductive body to penetrate therein in the presence of a second impurity of the opposite conductivity-type having a relatively low segregation constant and a relatively high diffusion velocity and the second impurity is caused to diffuse into the body via the solid-liquid interface to form a diffused region whose conductivity is generally dominated by the second impurity and the melt is thereafter cooled to recrystallize a semiconductive region adjacent the diffused region whose conductivity is dominated by the first impurity, the improvement comprising in combination therewith the step of, after the diffusing step forming the diffused region but before the cooling to recrystallize step, subjecting the body and material to a further thermal treatment at a temperature just above that of the diffusing step causing the molten electrode-forming material to penetrate deeper into the body and dissolve the adjacent portion of the diffused region to at least partly eliminate the portions thereof containing substantial quantities of the first impurity, said further thermal treatment having so short a duration that substantially no further diffusion of the said impurities occurs.

2. A method as set forth in claim 1 wherein the further thermal treatment has a duration of less than one-tenth the duration of the fusion step forming the diffused region.

3. A method for making a transistor as set forth in claim 1, wherein the electrode-forming mass contains also the second impurity, the diffused region is the base, the recrystallised region is the emitter, and the adjacent portion of the diffused region containing substantial quantities of the first impurity is dissolved to at least half of its depth.

4. A method as set forth in claim 2 wherein all the portions of the diffused region containing substantial quantities of the first impurity are dissolved.

5. In the method of manufacturing a semiconductor device in which a mass of electrode-forming material containing a first active impurity of one conductivity-type having a relatively high segregation constant and a relatively low diffusion velocity is fused to a semiconductive body in the presence of a second impurity of the opposite conductivity-type having a relatively low segregation constant and a relatively high diffusion velocity and the second impurity is caused to diffuse into the body via the solid-liquid interface to form a diffused region whose conductivity is generally dominated by the second impurity and the melt is thereafter cooled to recrystallize a semiconductive region adjacent the diffused region whose conductivity is dominated by the first impurity, the improvement comprising in combination therewith the step of, after the diffusing step but before the cooling step, increasing the quantity of electrode-forming material in the molten state, causing it to penetrate deeper into the body and dissolve the adjacent portion of the diffused region to at least partly eliminate the portions thereof containing substantial quantities of the first impurity, said step of increasing the quantity of electrode-forming material having a duration so short that substantially no further impurity diffusion occurs.

References Cited in the file of this patent

UNITED STATES PATENTS

| | | |
|---|---|---|
| 2,793,145 | Clarke | May 21, 1957 |
| 2,836,521 | Longini | May 27, 1958 |
| 2,836,522 | Mueller | May 27, 1958 |
| 2,840,497 | Longini | June 24, 1958 |
| 2,907,969 | Seidensticker | Oct. 6, 1959 |